Patented Apr. 22, 1941

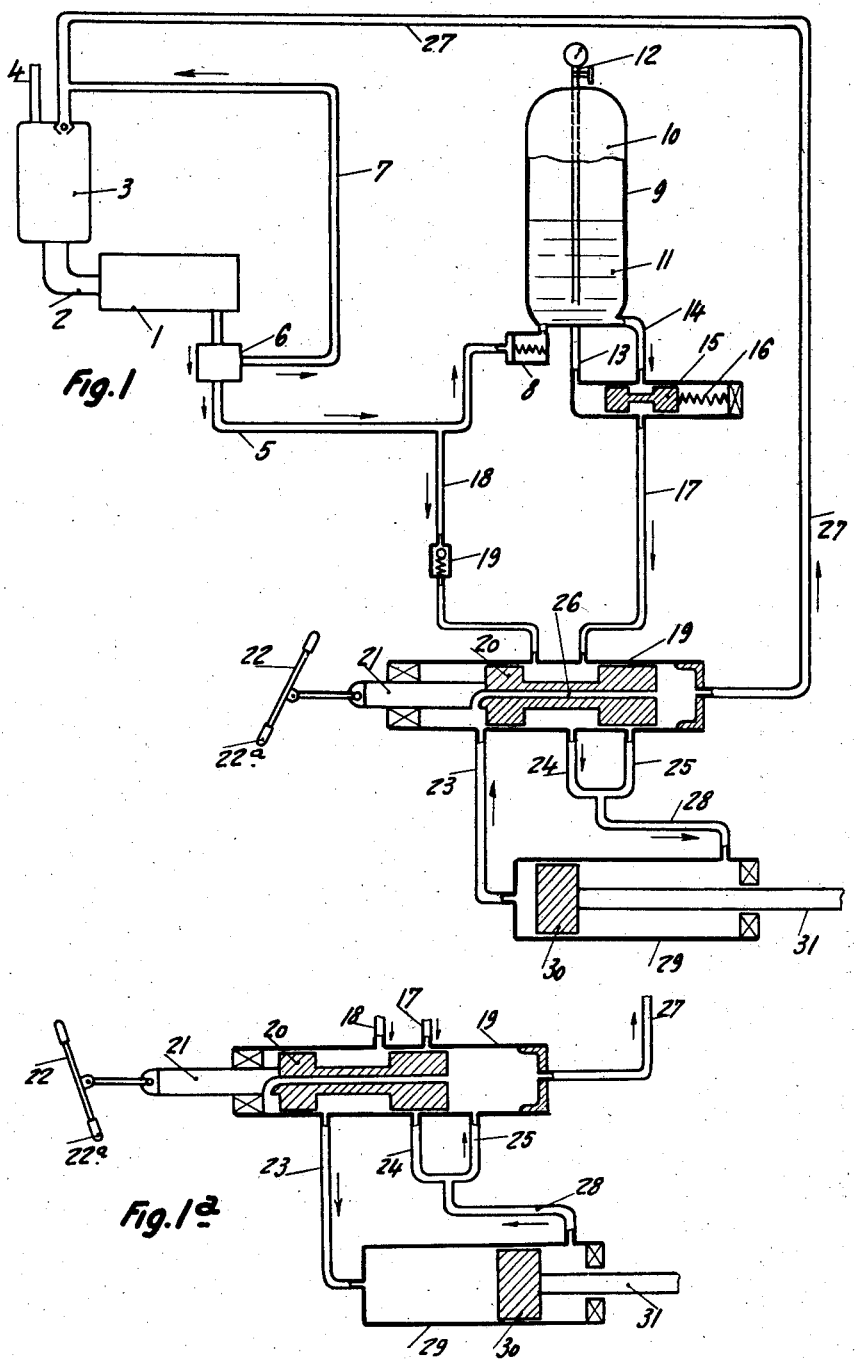

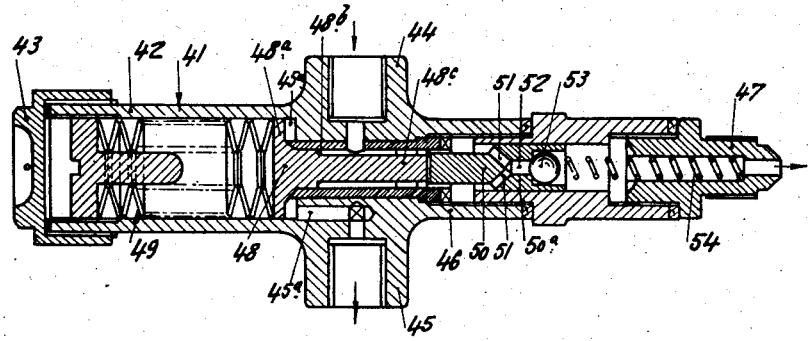
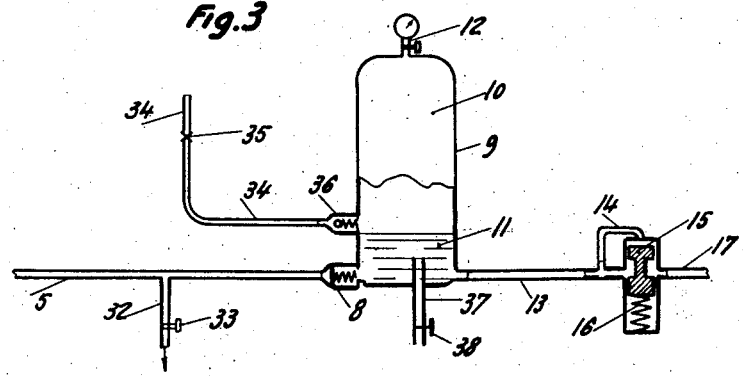
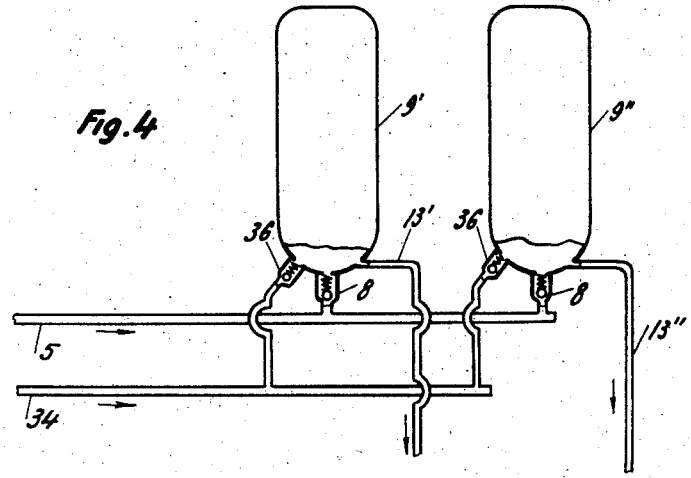

2,239,566

UNITED STATES PATENT OFFICE 2,239,566

HYDRAULIC SYSTEM

Jean Mercier, Neuilly-sur-Seine, France

Application December 10, 1937, Serial No. 179,074
In France September 27, 1937

3 Claims. (Cl. 60—52)

The present invention, relates to plants for hydraulic, oleo-pneumatic or like control, of the type comprising a pump or compressor adapted to place the fluid under pressure, a recipient forming an accumulator for storing the energy supplied by the pump, and a distributor for supplying the energy to the points of utilization. Plants of this kind are chiefly adapted for use upon airplanes, and serve to control the various parts of these machines, such as disappearing landing gear, wing-flaps, controls, lifting surfaces, and the like.

One object of the invention is to provide for a plant which would permit the pilot of performing at any time the desired controls while placing at his disposal a sufficient amount of fluid under pressure contained in a suitable storing device which is not emptied during a single operation.

Another object of the invention is to provide an accumulator tank having no excessive size nor weight, and chiefly in the case of airplanes of very large size in which the control of the various parts, requires a very great power. At this effect the several parts are so arranged, that the controlling operations in one direction will be performed directly by the action of the pump, while the operations in the other direction, which must take place very rapidly, will be performed by means of the accumulator, and if necessary, in combination with the action of the pump.

For this purpose, the delivery conduit, and the control conduit leading from the accumulator, are connected to a distributor operated by the pilot and adapted to connect either of the said conduits, or if required, both conduits at the same time, to a device actuating the part to be controlled, according as it is desired to obtain a movement in one direction or the other.

Further characteristics of the invention will be disclosed in the following description:

The accompanying diagrammatic drawings, which are given solely by way of example, represent various constructional forms of the plant according to the invention.

Fig. 1 is a diagram of the complete plant for hydraulic control which is established according to the invention and is applied to the control of landing gear of the lifting type.

Fig. 1a shows the distributer of this plant in a position corresponding to the lifting of said gear.

Fig. 2 is a view in greater detail, of the device termed "de-compressor," adapted for discharging and relieving the pump.

Fig. 3 shows an accumulator comprised in the plant, serving for the automatic recharging of air, and the conduits leading to or from the said accumulator.

Fig. 4 shows two accumulators in conformity with Fig. 3, which are mounted in parallel on their conduits for supply or recharging, and serve for the control of the different parts.

In the embodiment shown in Figure 1, a pump 1 withdraws oil or other liquid through a conduit 2 which has preferably a large cross section and a short length, from an oil tank 3 which is preferably mounted above the said pump and may be filled through a conduit 4, which also serves as an atmospheric outlet for the said tank. The pump delivers oil under pressure into a pipe 5 on which is preferably mounted a device 6 termed "de-compressor," which is adapted to connect the delivery end of the pump to the oil tank 3 when the pressure in the hydraulic circuit attains a maximum value. The said device, which is shown in Figure 2, will be further described.

The delivery pipe is divided, at the downward side of the device 6, into two branches, one of which leads to an oleo-pneumatic accumulator, and supplies to this accumulator the oil 11, while compressing an air cushion 10. At the point at which the pipe 5 enters the said accumulator, there is located a check-valve 8 adapted for the automatic separation of the said accumulator from the pipe 5 and from the parts of the plant situated on the upstream side, in the case in which, by reason of damage of any kind, the pressure in such parts should fall below the pressure in the said accumulator. If necessary, this latter may receive additional supplies of air through a valve 12 which is preferably provided with a pressure-gauge.

The fluid under pressure which is collected in the accumulator 9 may be discharged, for instance, through two pipes 13 and 14. The pipe 13 leads to a pressure-regulator comprising a movable part 15 forming a slide-valve, and it causes the pressure prevailing in the accumulator to act upon one side of the said valve, the other side being subjected to the action of a calibrated spring 16. The pipe 14 leads to the regulator 15—16 at a point which is uncovered by the valve as long as the pressure in the accumulator is sufficient to overcome the resistance of the spring 16 (position shown in Fig. 1); but which is covered by the said valve when the pressure in the accumulator falls below that of the spring 16. The pipe 14 is extended on the other side of the pressure regulator by a pipe 17 leading to a distributer 19. To this latter is also connected, preferably with the interposition of a check-valve 19, the branch 18 of the delivery conduit of the pump 1. The pipe 17 may comprise a check-valve, not shown.

The said distributer, which may be of any suitable construction, comprises in the present case a member 20 which is movable in the frame 19. The said member, which forms a slide-valve, is secured to a rod 21 which is pivoted to an operating lever 22, pivotally mounted at a fixed point 22a. According to the position of the lever 22, the slide-valve will close the inlet of one of the pipes 17 and 18, in the said frame. On the other hand, the slide-valve controls the inlets of the pipes 23 and 24—25, which lead to a device 29 controlling the apparatus to be operated in contrary directions. In the interior of the valve 20 is located a conduit 26 adapted to connect the pipe 23 or the pipe 25 to the exhaust pipe leading to the oil tank 3. The two pipes 24 and 25 form a single conduit 28 which is connected to the right-hand side (Fig. 1) of the controlling device 29 which herein consists of a jack having a cylinder 29 and a piston 30, whose rod 31 acts upon the rod-and-link gear of the apparatus to be actuated. At the other end, the pipe 23 is connected to the device 29, to the left of the piston 30 (Fig. 1).

If it is supposed that in the present construction, the question relates to the control of a landing device of the disappearing type, and that the movement of the piston to the right corresponds to the lifting of the said device, whilst the movement of the piston to the left corresponds to the lowering of the same, it will be noted that the pipe 24 must be connected to the circuit under pressure (position as in Fig. 1) in order to lower the landing device, and that for the lifting of the device, the pipe 23 must be connected to the circuit under pressure (position as in Fig. 1a). The piping 25—28 provides for the discharge in the position shown in Fig. 1a; in the position of the distributer 19 shown in Fig. 1, the discharge takes place through the pipe 23 and the channel 26 of the slide-valve.

It is observed that in Fig. 1, which corresponds to the descent of the landing device, the two pipes 17 and 18 are uncovered by the valve 20, and thus the lowering of the device, which must take place in a very short time, and in a most reliable manner, is effected by the combined action of the pump 1 (through the pipe 18) and of the accumulator 9 (through the piping 14—17).

It is also possible, by shifting the valve 20 to its extreme right hand position, to shut off the pipe 18, so that the lowering of the landing gear is effected by the accumulator 9 alone (through the pipes 14, 17, 24 and 28), if the energy of the pump should not be available or be needed for some other purpose at the time of the landing.

On the contrary, for the lifting of the device, which in the case of the heavy airplanes requires a considerable energy, the pipe 27 connecting the distributer 19 to the accumulator 9 is closed off by the valve 20, and it is only the discharge piping 5—18 of the pump which now acts, through the said distributer and the pipe 23, upon the controlling device 29—30 (see Fig. 1a).

Thus the accumulator 9 is only used for a certain number of the controls, and chiefly for the controls requiring a rapid and most reliable action. For this reason, the accumulator may now have a much smaller size and weight than in the case in which all the necessary movements are to be effected by the use of the said accumulator.

Fig. 2 shows a constructional form of "de-compressor," which is mounted on the discharge pipe 5 of the pump 1.

In this construction, the apparatus comprises a main body 41 provided with a tubular part 42 which may be closed by a cap 43, and a coupling neck 44 connected to the pump, compressor or like apparatus, also a coupling neck 45 which is connected to the by-pass pipe, and a coupling part 46 which is connected to the conduit of utilization. The part 46 may contain a tubular member 47 which is directly connected to the said conduit of utilization. It is evident that the conduit 47 might lead to an accumulator of any suitable type, if so desired.

The part 42 contains a valve 48 comprising a part 48a of large diameter, a part 48b of smaller diameter, and a cylindrical part 48c of a still smaller diameter. The part 48a may be subject to the action of an elastic antagonistic device 49 of a suitable type. The said valve, when actuated against the device 49, connects the conduit 44 to the conduit 45 through the space and the channel 45a.

In line with the valve 48 is located an auxiliary device 50 comprising a part 50a of a relatively large cross section. The area of this section is at least equal to the area of the section 48b. The member 50 contains channels 51 and 52, making connection between the conduits 44 and 47. The channel 52 may be closed by a check-valve which consists, for example, of a ball 53 and a spring 54.

The operation of the said apparatus is as follows:

In normal conditions, the pump delivers through the conduit 44 and the conduits 51, 52 and 47. When the pressure of the delivered fluid exceeds a given limit determined by the spring 49, the valve 48 is driven to the left (according to the figure), thus placing the pump in short-circuit or on the discharge, owing to the connection between the conduit 44, the space 45a and the conduit 45. In consequence, the pressure in the conduit 44 will suddenly drop. However, the pressure in the conduit 47 will still be equal to the pressure in the accumulator or in the conduit of utilization. It is exerted upon the part 50a of the member 50, which is thus driven with force to the left, and makes a sudden contact with the part 48c of the valve, which is thus entirely opened. As long as the pressure in the conduit 47 exerted upon the surface 50a remains above a certain limit, the pump will not deliver into the conduit of utilization. Thus for example, if it is admitted that the pressure limit for the pump has been given a valve of 250 kgs. per sq. cm., and supposing that the surfaces 48b and 50a have diameters of 8 and 9 mm. respectively, the valve 48 will remain open as long as the pressure in the conduit of utilization shall not have fallen below 200 kgs. approximately. When this occurs, the member 50 will be driven with force to the right (according to the figure), and thus the valve 40 will again cut off the pump from the conduit 45, and the plant may now continue to operate in normal conditions.

Owing to this arrangement, the pump can be actually relieved, by connecting it for a certain time to the tank 3, or by placing it in short-circuit.

Fig. 3 shows an accumulator 9 which is provided with means for an automatic charging with compressed air, and in this case it is no longer necessary to provide for any special upkeep of the said accumulator.

It is a known fact that all airplanes are now provided with a certain quantity of compressed air having a given pressure, for instance 30 kgs. per sq. cm. If the accumulator 9, for any reason, should become emptied to such a degree that the volume of air in the accumulator 9 should become too small after another compression (at 250 kgs. per sq. cm. for instance), it is possible, according to the present invention, to compensate for this loss of air by making a connection between the accumulator and the source of compressed air on board the airplane. This connection is made, in the apparatus shown in Fig. 3, by a pipe 34 which brings the air from the said source to the accumulator 9, while passing through a check-valve. This circulation takes place when the pressure in the accumulator falls below a stated value. The pipe 34 is preferably provided with a cock 35 by which it can be closed, for instance in the case of failure of the source of air supply.

It will be noted that the apparatus shown in Fig. 3 represents a plant for hydraulic control in which practically no upkeep is required as long as the pump 1 is in proper service, and the conduits, valves, distributers and the like are in normal operation, since the accumulator is automatically supplied with air. In consequence, a special filling valve, such as is shown in Fig. 1 at 12, is no longer required.

Fig. 4 shows two accumulators adapted for an automatic recharging with air, of the type represented in Fig. 3. These are mounted in parallel on the discharge pipe 5 of the pump and on the compressed air delivery pipe 34. The accumulator 9' may be used for the control circuit of the landing device under the control of the pipe 13'; the accumulator 9" provided with a pipe 13" serves to produce a pressure in the circuit of the other devices under control, such as flaps, lifting wings, rudder, wing-flaps, etc.

Obviously, the said invention is not limited to the embodiments herein described and represented, which are given solely by way of example. It is possible, for instance, without exceeding the limits of the invention, to make use of more than two accumulators in the same plant. Each accumulator 9 may comprise an emptying conduit 37, with a cock 38, as shown in Fig. 3. In like manner, an emptying conduit 32, with a cock 33, may be mounted on the discharge pipe 5. Such conduits will provide for the rapid evacuation of the hydraulic circuit, for instance in the case of repairs, or in order to provide for an automatic supply of air. One or more pressure regulators of the type represented at 15—16 may also be mounted on any device in the hydraulic circuit which is to be cut off in the case of an abnormal reduction of pressure. Thus, for instance, one of the said regulators may be mounted in the pipe 5 in front of the check-valve 8.

Having now described my invention, what I claim as new and desire to secure by Letters Patent is:

1. A hydraulic system comprising a pump, a tank supplying liquid to said pump, said pump having a discharge pipe connected to the inlet of a hydro-pneumatic accumulator, a check valve in said accumulator inlet arranged to prevent flow out of said accumulator, said accumulator having an outlet controlled by a valve which closes the outlet when accumulator pressure drops below a predetermined minimum, a reversing valve structure, separate connections from the pump discharge pipe and said accumulator outlet to spaced points on said valve structure, a cylinder having a piston therein, a conduit connecting one end of said cylinder to said valve structure, a conduit from the other end of said cylinder and branched to connect with two spaced points on said valve structure, a return line between said valve structure and the supply tank, and a valve member in said valve structure having an internal bore in constant communication with said return line, said valve member being movable to connect said one cylinder and to the pump discharge pipe and the other cylinder end to the return line, or to connect said one cylinder end to the return line and said other cylinder end selectively to either the pump discharge pipe, the accumulator outlet, or to both the pump discharge pipe and the accumulator outlet simultaneously.

2. A hydraulic system comprising a pump, a tank supplying liquid to said pump, said pump having a discharge pipe connected to the inlet of a hydro-pneumatic accumulator, a check valve in said accumulator inlet arranged to prevent flow out of said accumulator, said accumulator having an outlet controlled by a valve which closes the outlet when accumulator pressure drops below a predetermined minimum, a reversing valve structure, separate connections from the pump discharge pipe and said accumulator outlet to spaced points on said valve structure, a cylinder having a piston therein, a conduit connecting one end of said cylinder to said valve structure, a conduit from the other end of said cylinder and branched to connect with two spaced points on said valve structure, a return line between said valve structure and the supply tank, and a valve member in said valve structure, said valve member being movable to connect said one cylinder end to the pump discharge pipe and the other cylinder end to the return line, or to connect said one cylinder end to the return line and said other cylinder end selectively to either the pump discharge pipe, the accumulator outlet, or to both the pump discharge pipe and the accumulator outlet simultaneously.

3. A hydraulic system comprising in combination, a pump, a tank supplying liquid to said pump, a hydro-pneumatic accumulator having an inlet, a connection from the discharge side of said pump to said accumulator inlet, a check valve in said accumulator inlet adapted to prevent flow out of said accumulator, said accumulator having an outlet controlled by a valve which closes the outlet when accumulator pressure drops below a predetermined minimum, a reversing valve including a valve casing, separate connections from the pump discharge line and said accumulator outlet, respectively, to spaced points along the length of said casing, a cylinder, a piston in said cylinder, a conduit connecting one end of said cylinder to said casing, a conduit starting from the other end of said cylinder and branched to connect with two spaced points along the length of said casing, a return line between said supply tank and one end of said casing, fluid passage means for permanently connecting together the two ends of said casing, and a slide valve element in said valve casing, movable with respect thereto, to connect said one cylinder end to the pump discharge pipe and the other cylinder end to the return line, or to connect said one cylinder end to the return line and said other cylinder end, respectively, to either the pump discharge pipe, the accumulator outlet, or to both the pump discharge pipe and accumulator outlet simultaneously.

JEAN MERCIER.